US012638468B2

(12) United States Patent
     Morita

(10) Patent No.:   US 12,638,468 B2
(45) Date of Patent:        May 26, 2026

(54) VEHICLE SPEED CALCULATION DEVICE AND VEHICLE SPEED CALCULATION METHOD

(71) Applicant: Hitachi, Ltd., Tokyo (JP)

(72) Inventor: Kazuki Morita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 505 days.

(21) Appl. No.: 18/249,582

(22) PCT Filed: Oct. 26, 2021

(86) PCT No.: PCT/JP2021/039447
     § 371 (c)(1),
     (2) Date: Apr. 19, 2023

(87) PCT Pub. No.: WO2022/097534
     PCT Pub. Date: May 12, 2022

(65) Prior Publication Data
     US 2023/0384338 A1      Nov. 30, 2023

(30) Foreign Application Priority Data
     Nov. 5, 2020    (JP) .................................. 2020-185026

(51) Int. Cl.
     *G01P 3/00*          (2006.01)
     *B61L 25/02*         (2006.01)
(52) U.S. Cl.
     CPC .............. *G01P 3/00* (2013.01); *B61L 25/021* (2013.01)
(58) Field of Classification Search
     CPC ................................. B61L 25/021; G01P 3/00
     See application file for complete search history.

(56) References Cited

U.S. PATENT DOCUMENTS

| | | | | |
|---|---|---|---|---|
| 9,234,820 B2* | 1/2016 | Akiyama | ............ | G01M 13/025 |
| 10,442,449 B2* | 10/2019 | Singh | ........................ | B61K 9/06 |

(Continued)

FOREIGN PATENT DOCUMENTS

| | | |
|---|---|---|
| CN | 211809637 U | 10/2020 |
| GB | 2 454 594 A | 5/2009 |

(Continued)

OTHER PUBLICATIONS

International Search Report with English Translation and Written Opinion of International Patent Application No. PCT/JP2021/039447 dated Dec. 28, 2021 (10 pages).

(Continued)

*Primary Examiner* — Elias Desta
(74) *Attorney, Agent, or Firm* — Foley & Lardner LLP

(57)              ABSTRACT

In order to achieve improvement in reliability of a speed calculation device included in a railway vehicle while reducing cost increase due to redundancy of a device, a vehicle speed calculation device includes at least two shaft speed sensors, a non-contact speed sensor, a sensor receiving unit that receives at least two first detection values detected by the shaft speed sensor and a second detection value detected by the non-contact speed sensor, an estimated speed calculation unit that calculates an estimated speed at present time of the railway vehicle from a latest vehicle speed and acceleration of the railway vehicle, and a speed determination unit that determines a vehicle speed based on at least two of the first detection values, the second detection value, and the estimated speed. The speed determination unit determines the vehicle speed by selecting a required speed from at least two first speeds calculated from at least two of the first detection values, a second speed calculated from the second detection value, and the estimated speed based on an (Continued)

adhesive or non-adhesive state of a wheel including the shaft speed sensor.

12 Claims, 6 Drawing Sheets

(56)                References Cited

U.S. PATENT DOCUMENTS

2014/0277883 A1      9/2014  Pulliam et al.
2023/0339487 A1*   10/2023  Okuda  .................. F02M 26/06

FOREIGN PATENT DOCUMENTS

| JP | H05-249127 A | 9/1993 |
| JP | H06-030509 A | 2/1994 |
| JP | 2010-234978 A | 10/2010 |
| JP | 2016-125856 A | 7/2016 |
| JP | 2016-137731 A | 8/2016 |
| JP | 2017-163623 A | 9/2017 |

OTHER PUBLICATIONS

Extended European Search Report issued in corresponding EP Application No. 21889087.9, dated Sep. 19, 2024 (10 pages).

* cited by examiner

VEHICLE SPEED CALCULATION DEVICE AND VEHICLE SPEED CALCULATION METHOD

TECHNICAL FIELD

The present invention relates to a vehicle speed calculation device and a vehicle speed calculation method for calculating a traveling speed of a railway vehicle.

BACKGROUND ART

As a method of detecting a traveling speed of a railway vehicle, a shaft speed sensor is generally used. A shaft speed sensor can be installed on an axle of a vehicle and generate a speed pulse corresponding to a rotational speed of the axle, and calculates a traveling speed by using the speed pulse and a wheel diameter.

Further, a shaft speed sensor is inexpensive and highly accurate, but on the other hand, since a traveling speed is calculated from a rotational speed of an axle, it is difficult to calculate an accurate vehicle speed when a wheel falls into a non-adhesive state such as idling or sliding.

Therefore, in recent years, non-contact speed sensors such as a Doppler velocity sensor using the Doppler effect and a global navigation satellite system (GNSS) using positioning satellites have been increasingly used. The non-contact speed sensor is not affected by an adhesive state of a wheel, but on the other hand, is disadvantageous in terms of accuracy and cost as compared with a shaft speed sensor in many cases. In view of the above, a non-contact speed sensor and a shaft speed sensor are used in combination in many cases.

Further, in a case where a shaft speed sensor or a non-contact speed sensor fails, it is necessary to reliably detect the failure.

Therefore, as a prior art, PTL 1 discloses a technique of comparing a travel distance obtained from a shaft speed sensor with a travel distance obtained from a GNSS, and determining that a failure, idling, or sliding occurs in a case where a difference between the travel distances becomes large.

Further, PTL 2 discloses a technique of comparing a train speed obtained by a millimeter wave sensor with a train speed obtained based on a speed pulse from a shaft speed sensor, and determining that a failure occurs in a case where a difference between them exceeds a certain value.

CITATION LIST

Patent Literature

PTL 1: JP 2010-234978 A
PTL 2: JP 2017-163623 A

SUMMARY OF INVENTION

Technical Problem

In a case where a speed calculation device of a railway vehicle fails, not only a failed vehicle is stopped but also an entire railroad section where the failed vehicle is traveling is greatly affected. For this reason, if it is intended to improve reliability of a speed calculation device by making devices constituting the speed calculation device redundant, there is a problem that redundancy by using a plurality of devices cannot be easily realized from the viewpoint of cost since a non-contact speed sensor is expensive.

Solution to Problem

In order to solve the above problem, a representative one of a vehicle speed calculation device according to the present invention includes at least two shaft speed sensors that detect a rotational speed per unit time of an axle of a railway vehicle, a non-contact speed sensor that detects a speed of the railway vehicle in a non-contact manner with a railway track, a sensor receiving unit that receives at least two first detection values detected by the shaft speed sensor and a second detection value detected by the non-contact speed sensor, an estimated speed calculation unit that calculates an estimated speed at present time of the railway vehicle from a latest vehicle speed and acceleration of the railway vehicle, and a speed determination unit that determines a vehicle speed based on at least two of the first detection values, the second detection value, and the estimated speed. The speed determination unit determines the vehicle speed by selecting a required speed from at least two first speeds calculated from at least of the two first detection values, a second speed calculated from the second detection value, and the estimated speed based on an adhesive or non-adhesive state of a wheel including the shaft speed sensor.

Advantageous Effects of Invention

According to the present invention, it is possible to construct a vehicle speed calculation device capable of accurately detecting a vehicle speed and continuing operation even if one speed sensor fails while reducing increase in cost.

A problem, configuration, and effect other than those described above will be clarified by "Description of Embodiments" below.

DESCRIPTION OF EMBODIMENTS

Figure 1:
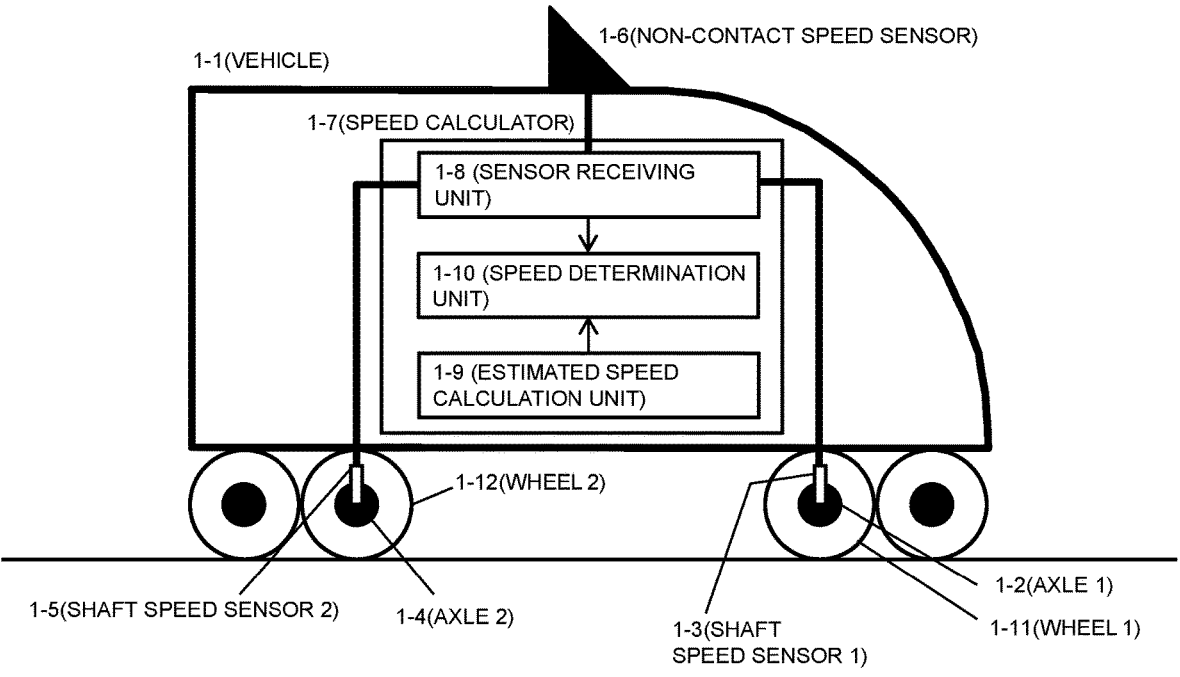
FIG. 1 is a diagram illustrating a basic configuration of a vehicle speed calculation device according to a first embodiment of the present invention.

Hereinafter, first and second embodiments will be described with reference to the drawings as modes for carrying out the present invention. However, it should be noted that the drawings are schematic. Further, the present invention is not limited by these embodiments. Further, in the drawings, the same portions are denoted by the same reference numerals.

First Embodiment

FIG. 1 is a diagram illustrating a basic configuration of a vehicle speed calculation device according to the first embodiment of the present invention.

A basic configuration of the vehicle speed calculation device according to the first embodiment includes two shaft speed sensors (1-3) and (1-5) that are mounted on a vehicle (1-1) and detect a rotational speed of axles (1-2) and (1-4) per unit time, a non-contact speed sensor (1-6) that detects a speed of the vehicle (1-1) in a non-contact manner with a track without using a rotational speed of the axles (1-2) and (1-4), and a speed calculator (1-7) that calculates a vehicle speed from an output of the shaft speed sensors (1-3) and (1-5) and an output of the non-contact speed sensor (1-6).

The speed calculator (1-7) includes a sensor receiving unit (1-8) that receives a detection value from the shaft speed sensors (1-3) and (1-5) and the non-contact speed sensor (1-6) and calculates a speed of each sensor, an estimated speed calculation unit (1-9) that calculates a current estimated speed from a latest vehicle speed, and a speed determination unit (1-10) that determines a vehicle speed based on speed information obtained from the sensor receiving unit (1-8) and the estimated speed calculation unit (1-9).

As the non-contact speed sensor (1-6), generally, a Doppler sensor, a millimeter wave sensor, an acceleration sensor, one using a GNSS, or the like is used.

Here, in general, the shaft speed sensors (1-3) and (1-5) capable of directly detecting a rotational speed of the axles (1-2) and (1-4) have higher accuracy in speed detection than the non-contact speed sensor (1-6). However, in a case where wheels (1-11) and (1-12) are in a non-adhesive state such as idling or sliding, a large deviation occurs between a vehicle speed and a rotational speed of the axles (1-2) and (1-4), and thus, a deviation also occurs between a speed calculated from the shaft speed sensors (1-3) and (1-5) and an actual vehicle speed. On the other hand, the non-contact speed sensor (1-6) is inferior in measurement accuracy to the shaft speed sensors (1-3) and (1-5), but can detect a vehicle speed that does not depend on a state of the wheels (1-11) and (1-12) as described above.

Next, a method of calculating a vehicle speed by the speed calculator (1-7) will be described.

Figure 3:
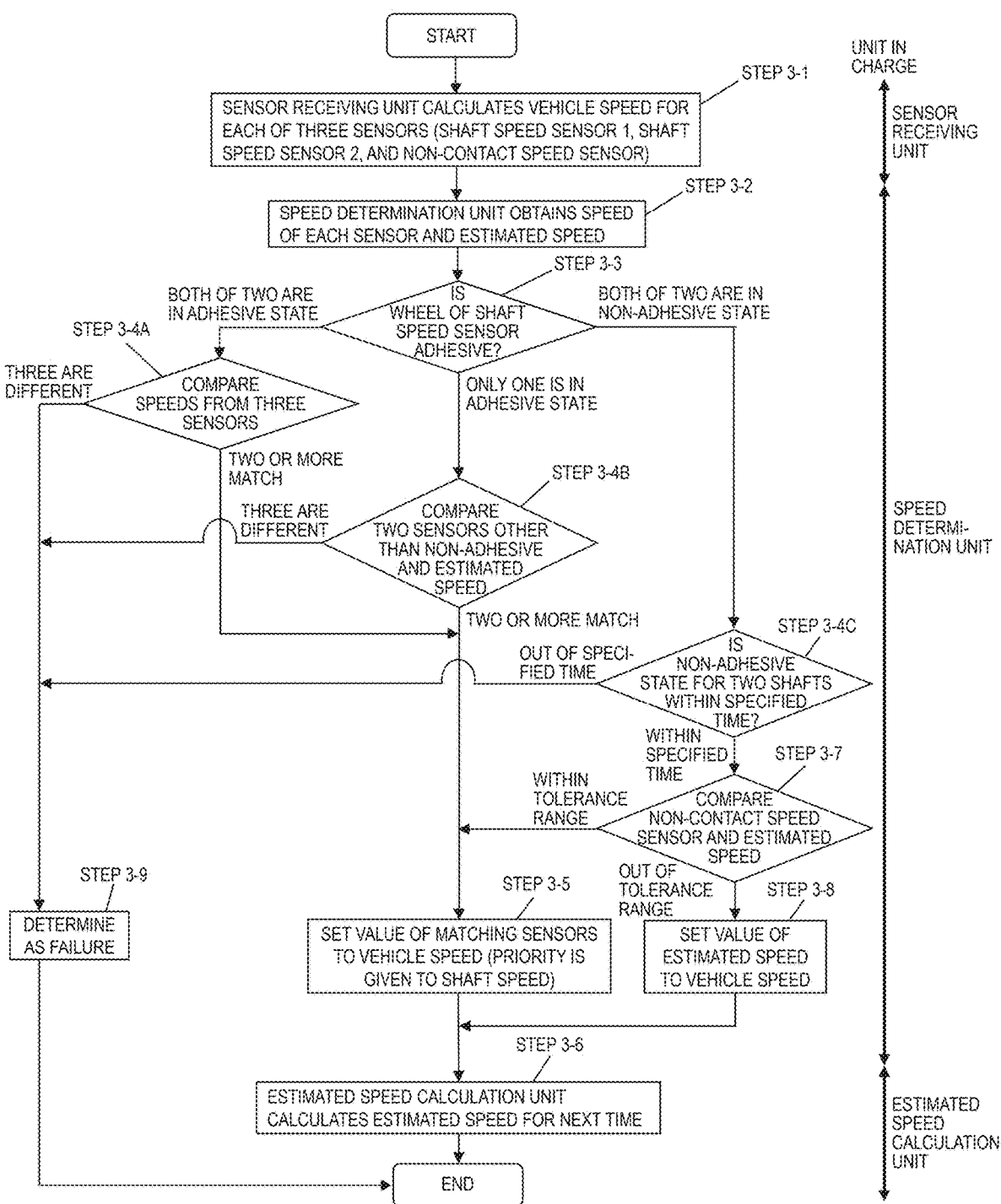
FIG. 3 is a diagram illustrating a flowchart of vehicle speed calculation executed by a speed calculator.

FIG. 3 is a flowchart illustrating vehicle speed calculation executed and processed by the speed calculator (1-7). Hereinafter, processing content of each step will be described along this flowchart.

In Step (3-1), the sensor receiving unit (1-8) calculates a vehicle speed for each sensor based on input values from the shaft speed sensors (1-3) and (1-5) and the non-contact speed sensor (1-6).

For example, in a case where a type in which an axle outputs N pulses per rotation is used as the shaft speed sensor, assuming that n pulses are received per measurement time t [s], a vehicle speed can be calculated by $(2\pi \cdot r \cdot n)/(N \cdot t)$ [m/s] with a radius of the wheel (1-11) or (1-12) as r [m].

On the other hand, as the non-contact speed sensor, there are a type in which this sensor directly reports a moving speed and a type that reports a coordinate point at the time of measurement like GNSS. In a case of the type of reporting a coordinate point, a distance moved within certain short time is considered as a linear motion, and can be calculated from a movement of a coordinate point, and a speed can be calculated by dividing a movement distance by movement time.

Here, calculation of a vehicle speed for each sensor is performed by the sensor receiving unit (1-8), but the present invention is not limited to this configuration. A configuration in which the sensor receiving unit (1-8) receives a detection value for each sensor and outputs the detection value as it is to the speed determination unit (1-10), and the speed determination unit (1-10) calculates a vehicle speed for each sensor from the detection value for each sensor may be employed.

In Step (3-2), the speed determination unit (1-10) receives a vehicle speed for each sensor from the sensor receiving unit (1-8) and an estimated speed from the estimated speed calculation unit (1-9). Here, the estimated speed is a speed predicted based on a latest vehicle speed. For example, in a case where a vehicle speed is calculated at regular intervals $\Delta t$, if this $\Delta t$ is sufficiently short with respect to a speed change of a vehicle, it can be considered that the vehicle is performing a constant acceleration motion. When a vehicle speed calculated before the last is v1 and a vehicle speed calculated the last time is v2, an acceleration a of a train is considered as $(v2-v1)/\Delta t$, and an estimated speed v3 this time can be simply considered as $v2+\{(v2-v1)/\Delta t\}\ \Delta t=v2+(v2-v1)=2v2-v1$.

In Step (3-3), the speed determination unit (1-10) determines whether the wheels (1-11) and (1-12) in which the shaft speed sensors (1-3) and (1-5) are installed are in an adhesive state or a non-adhesive state (idling or sliding state).

Here, as determination of a state of idling or sliding, for example, an acceleration is obtained from a speed change of a shaft speed sensor within certain time, and it is conceivable to determine that the state is an idling state when an acceleration of a certain value or more is detected, or a sliding state when a deceleration of a certain value or more is detected. Further, a state of idling or sliding may be obtained from an external device such as a brake control unit (BCU) or a drive device that directly controls a brake.

According to a determination result of Step (3-3), there are three cases ((a) to (c)) below.

(a) Case where all the Wheels (1-11) and (1-12) in which the Shaft Speed Sensors (1-3) and (1-5) are Installed are Determined to be in an Adhesive State (Both are in an Adhesive State)

In Step (3-4A), the speed determination unit (1-10) compares speeds calculated from two of the shaft speed sensors (1-3) and (1-5) and the non-contact speed sensor (1-6). In a case where a speed difference between the sensors exceeds a predetermined specified value, values obtained from the sensors are not used for calculation of a vehicle speed. A method of setting the predetermined specified value to a value obtained by adding tolerance of a speed calculated from a shaft speed sensor including tolerance of a wheel diameter and tolerance of a speed calculated from the non-contact speed sensor can be considered.

According to a comparison result in Step (3-4A), in a case where a speed difference between vehicle speeds from two or more sensors falls within (that is, matches with) a range of the predetermined specified value, in Step (3-5), one of values from matching sensors is given priority and used as a vehicle speed. In FIG. 3, "(priority is given to shaft speed)" is written in parentheses as a method of giving priority to a most accurate shaft speed among sensors being used and setting the shaft speed as a vehicle speed. However, the present invention is not limited to this method, and, in consideration of safety, a method of giving priority to a fastest speed and setting the speed to a vehicle speed may be employed.

After the above, in Step (3-6), a vehicle speed calculated in Step (3-5) is passed to the estimated speed calculation unit (1-9), and the estimated speed calculation unit (1-9) calculates an estimated speed for next speed calculation. Note that calculation of an estimated speed by the estimated speed calculation unit (1-9) is not limited to Step (3-6), and may be calculated using a vehicle speed calculated last time before Step (3-2).

(b) Case where One of the Wheels 1 (1-11) and 2 (1-12) in which the Shaft Speed Sensors (1-3) and (1-5) are Installed is Determined to be in an Adhesive State and the Other is Determined to be in a Non-Adhesive State.

In Step (3-4B), the speed determination unit (1-10) compares a speed calculated from each of a shaft speed sensor and the non-contact speed sensor (1-6) on the adhering side with an estimated speed. When a speed difference between the speed of one sensor to be used for comparison and the estimated speed exceeds a predetermined specified value, a value of the sensor is not used for calculation of a vehicle speed.

According to the comparison in Step (3-4B), in a case where a speed difference between vehicle speeds from two sensors falls within (that is, matches with) a range of the predetermined specified value, in Step (3-5), one of values from matching sensors is given priority and set as a vehicle speed. At this time, without using a value of an estimated speed, a method of giving priority to a most accurate sensor among sensors being used and using the sensor for a vehicle speed, a method of giving priority to a fastest speed and setting the speed to a vehicle speed in consideration of safety, or the like is used similarly to (a) described above.

(c) Case where Both the Wheels (1-11) and (1-12) in which the Shaft Speed Sensors (1-3) and (1-5) are Installed are Determined to be in a Non-Adhesive State In Step (3-4C), the speed determination unit (1-10) checks whether or not time during which both the wheels (1-11) and (1-12) continue to be in a non-adhesive state (idling or sliding state) is within specified time.

Regarding this, a non-adhesive state of a wheel is usually a transient state, and a non-adhesive state continuing for a long time is not considered as a normal state, and when both the wheels (1-11) and (1-12) become in a non-adhesive state, both the shaft speed sensors (1-3) and (1-5) become unusable. For this reason, only the non-contact speed sensor (1-6) and an estimated speed are used, and long-term use is not preferable in terms of accuracy. Therefore, when a non-adhesive state is not within the specified time, the processing proceeds to Step (3-9).

Note that the specified time described above may be maximum time during which a wheel is in a non-adhesive state, and the specified time is determined by vehicle characteristics such as a braking force and weight. The specified time may be changed at the time of acceleration or deceleration instead of having a constant value.

In a case where a non-adhesive state is within the specified time, the processing proceeds to Step (3-7).

In Step (3-7), the speed determination unit (1-10) compares the speed calculated from the non-contact speed sensor (1-6) with an estimated speed. According to this comparison, in a case where speed difference between the speed calculated from the non-contact speed sensor (1-6) and the estimated speed falls within a range of tolerance of a speed calculated from the non-contact speed sensor (1-6), the speed determination unit (1-10) sets the value from the non-contact speed sensor (1-6) as a vehicle speed in Step (3-5). On the other hand, in a case where the speed difference is out of the range of tolerance (a failure of the non-contact speed sensor (1-6) or the like is assumed), in Step (3-8), the speed determination unit (1-10) sets the estimated speed as a vehicle speed.

Further, in the above description, in a case where mutual speed values of speeds calculated from three sensors do not match with each other in Step (3-4A) and Step (3-4B), and in a case where time during which both the wheels (1-11) and (1-12) are in a non-adhesive state (idling or sliding state) is not within the specified time in Step (3-4C), in Step (3-9), the speed determination unit (1-10) determines that there is a failure and takes measures such as stopping a system.

Next, a result of calculating a vehicle speed according to the present invention will be described with reference to FIGS. 4 to 7. In FIGS. 4 to 7, the horizontal axis represents a vehicle position, and the vertical axis represents a vehicle speed.

Figure 4:
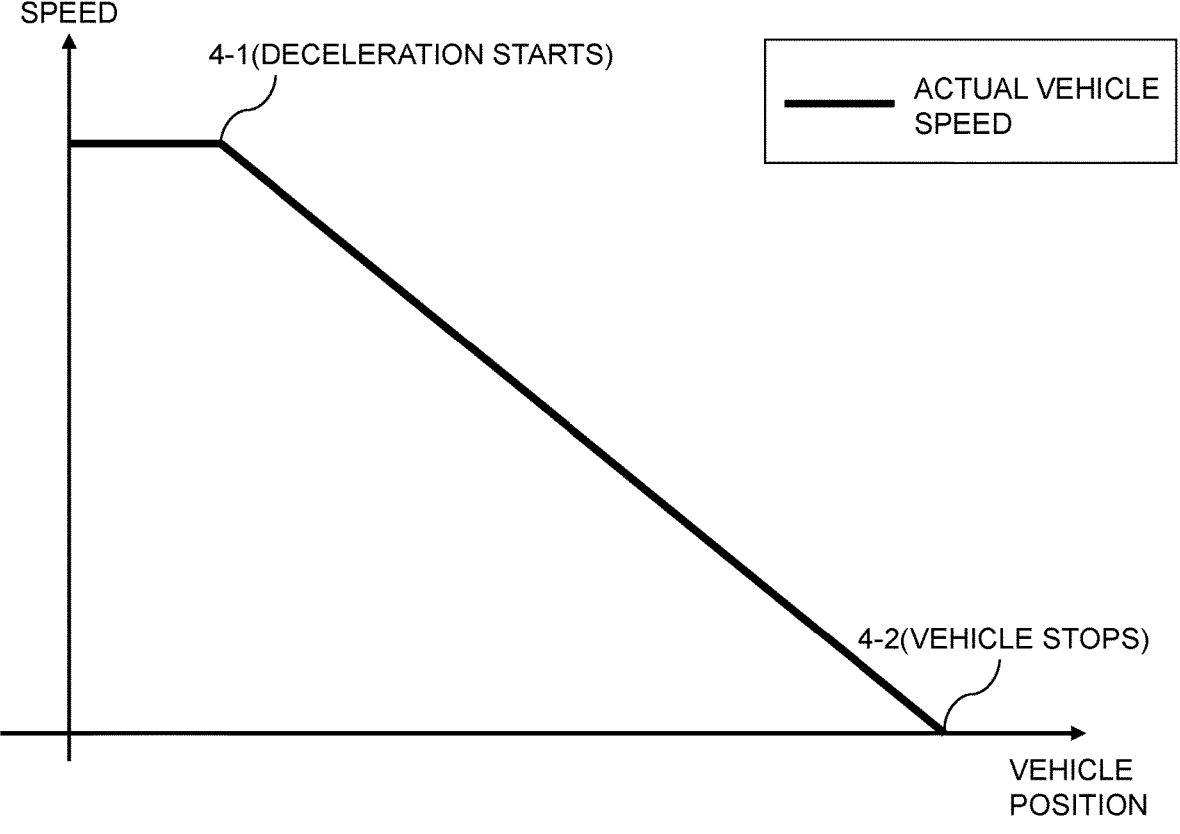
FIG. 4 is a diagram schematically illustrating a state of deceleration at a constant acceleration.

FIG. 4 is a diagram schematically illustrating a state in which the vehicle (1-1) traveling at a certain constant speed brakes and decelerates at a constant acceleration.

Figure 5:
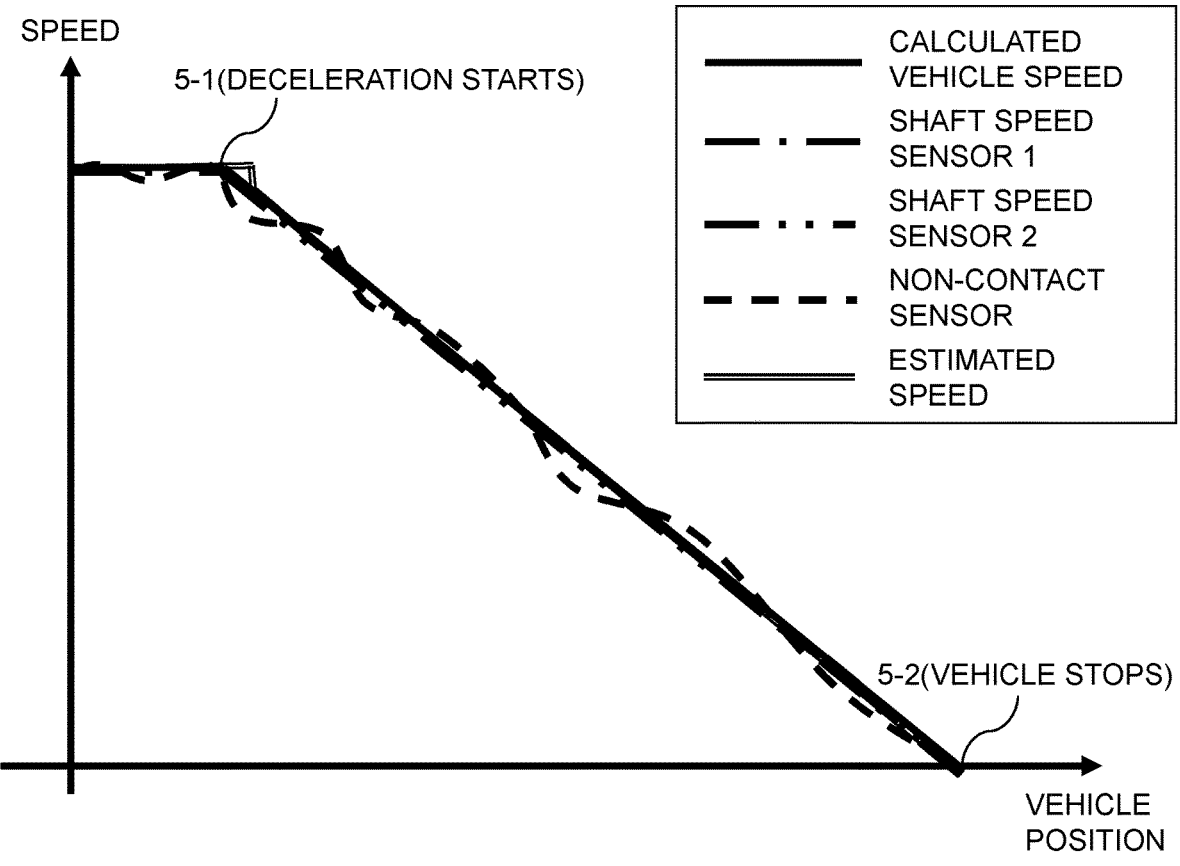
FIG. 5 is a diagram illustrating a speed calculation result in a case where both wheels in which a shaft speed sensor is attached to an axle keep an adhesive state.
Figure 6:
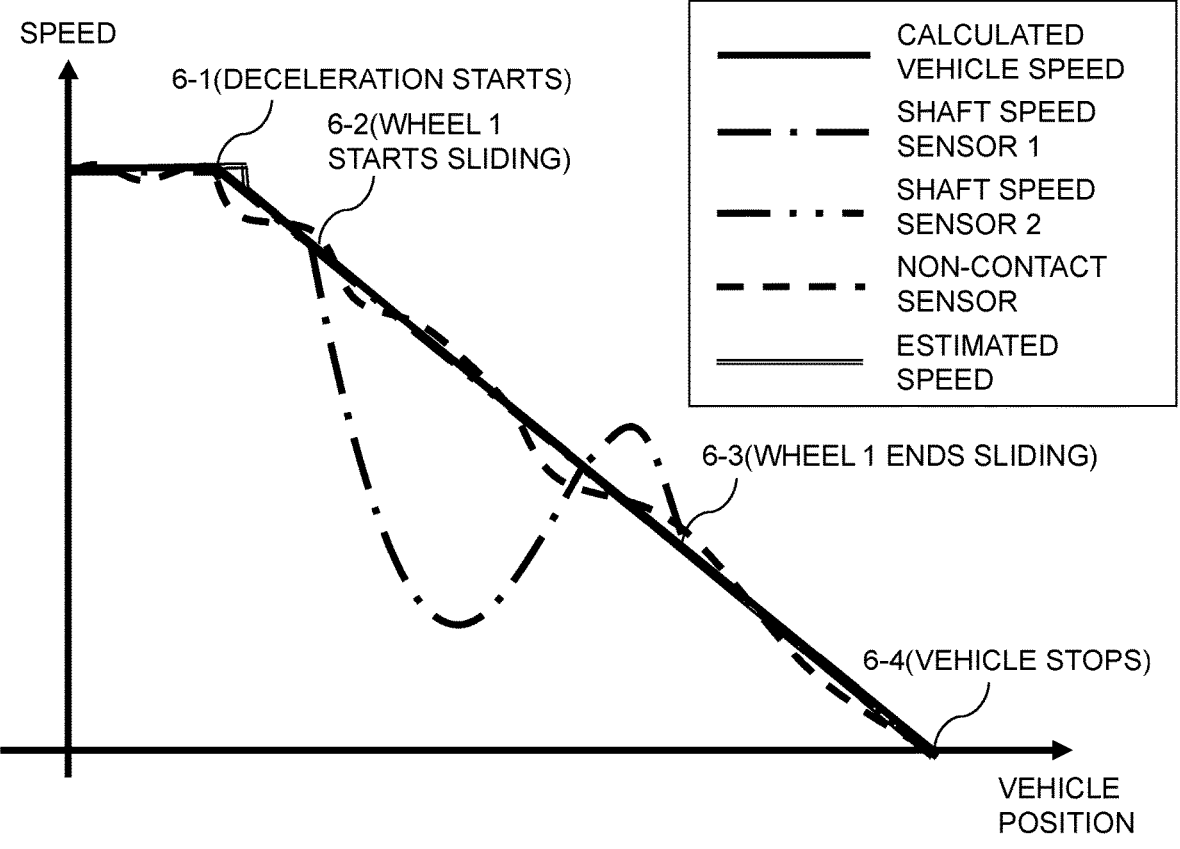
FIG. 6 is a diagram illustrating a speed calculation result in a case where only one wheel in which a shaft speed sensor is attached to an axle is non-adhesive.
Figure 7:
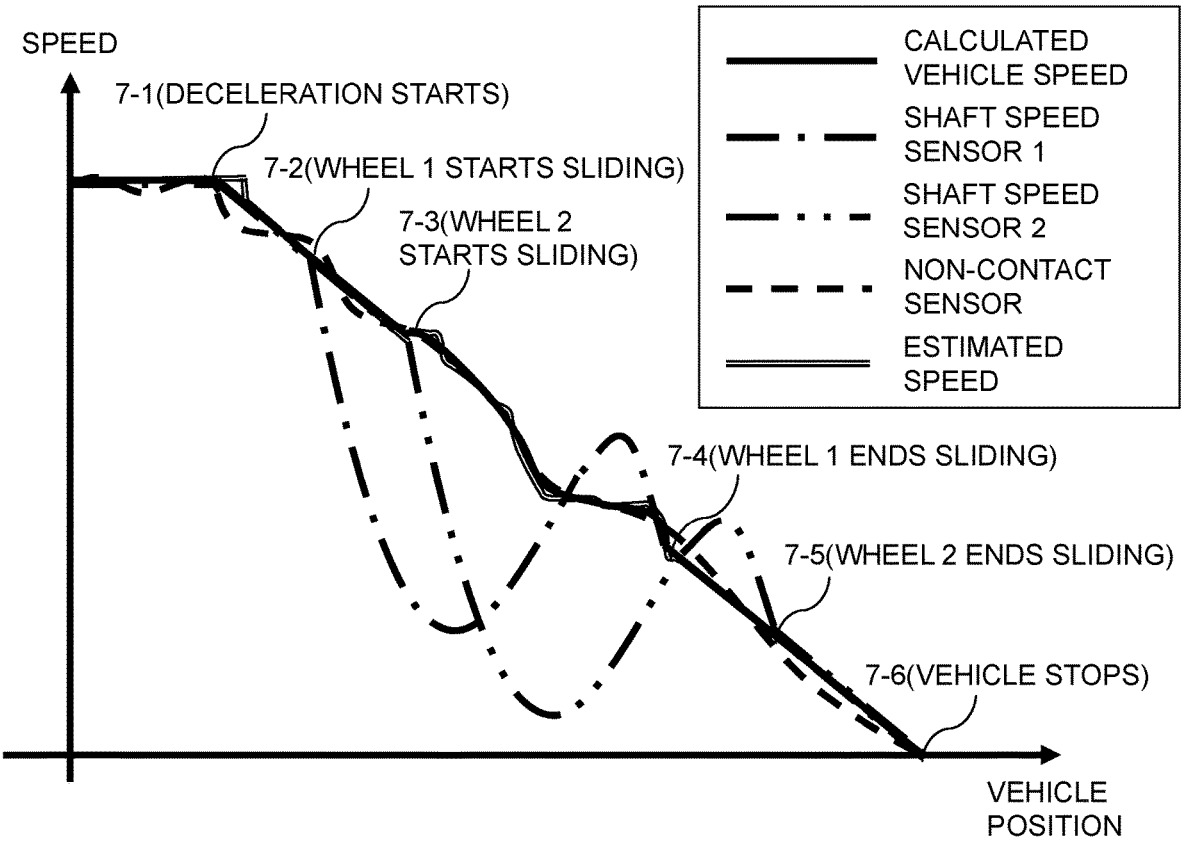
FIG. 7 is a diagram illustrating a speed calculation result when both wheels in which a shaft speed sensor is attached to an axle are in a non-adhesive state.

Next, FIGS. 5 to 7 are diagrams illustrating a result calculated by the present invention for a speed of the vehicle (1-1) illustrated in FIG. 4. As described above, in a case where a vehicle brakes while traveling, the wheels (1-11) and (1-12) may slide.

FIG. 5 is a diagram illustrating a calculation result in a case where both the wheel (1-11) having the shaft speed sensor (1-3) attached to the axle (1-2) and the wheel (1-12) having the shaft speed sensor (1-5) attached to the axle (1-4) maintain an adhesive state from the start of deceleration of the vehicle (1-1) as a brake is applied until the vehicle (1-1) stops.

In FIG. 5, since the wheels (1-11) and (1-12) do not slide or idle from deceleration start (5-1) to vehicle stop (5-2), the speed calculator (1-7) calculates a speed based on a value of the shaft speed sensors (1-3) and (1-5) with high accuracy as a vehicle speed. In this case, even if one of three, the shaft speed sensor 1 (1-3), the shaft speed sensor 2 (1-5), and the non-contact speed sensor (1-6), fails, the remaining two normally function, so that the process of the flowchart illustrated in FIG. 3 does not change and the function and accuracy can be maintained.

FIG. 6 is a diagram illustrating a calculation result in a case where either one of the wheels (1-11) and (1-12) including the shaft speed sensors (1-3) and (1-5) slides or idles to be in a non-adhesive state and the remaining one is kept in an adhesive state from when a brake is applied and the vehicle (1-1) starts to decelerate to when the vehicle (1-1) stops.

In FIG. 6, between deceleration start (6-1) and vehicle stop (6-4), the wheel 1 (1-11) to which the shaft speed sensor 1 (1-3) is attached slides in a section from a point (6-2) to a point (6-3). For this reason, in the section from the point (6-2) to the point (6-3), as indicated by an alternate long and short dash line in FIG. 6, a speed obtained from the shaft speed sensor 1 (1-3) indicates a value that meanders greatly. Referring to the flowchart illustrated in FIG. 3, in Step (3-4B), a speed obtained from the shaft speed sensor 1 (1-3) is excluded from the vehicle speed calculation.

On the other hand, since the wheels 2 (1-12) maintains an adhesive state, a speed obtained from the shaft speed sensor 2 (1-5) does not meander as indicated by an alternate long and two short dashes line in FIG. 6 (substantially similar characteristics to a solid line in the diagram).

Further, as indicated by a broken line in FIG. 6, a speed obtained from the non-contact speed sensor (1-6) is not affected by an adhesive or non-adhesive state of a wheel, and thus can be measured without much difference from a speed obtained from the shaft speed sensor 2 (1-5). For this reason, the speed calculator (1-7) sets a speed based on a value of the shaft speed sensor 2 (1-5) with higher accuracy than the non-contact speed sensor (1-6) to a vehicle speed (Step (3-5) in FIG. 3).

Here, a case where one of three, the shaft speed sensor 1 (1-3), the shaft speed sensor 2 (1-5), and the non-contact speed sensor (1-6), fails will be described.

In a case where the shaft speed sensor 1 (1-3) fails, a shaft speed sensor (here, the shaft speed sensor 1 (1-3)) installed in a wheel in a non-adhesive state is excluded from an input condition of speed calculation in Step (3-3) of FIG. 3, therefore the process of the flowchart of FIG. 3 does not change, and the function and accuracy can be maintained.

In a case where the shaft speed sensor 2 (1-5) for a wheel in an adhesive state fails, a vehicle speed calculated from the shaft speed sensor 2 (1-5) cannot be a vehicle speed because the vehicle speed is compared and not matched with a speed calculated from the non-contact speed sensor (1-6) in Step (3-4 B) of FIG. 3 and the vehicle speed is compared and not matched with the estimated speed. Therefore, a value of the non-contact speed sensor (1-6) is determined as a vehicle speed.

In a case where the non-contact speed sensor (1-6) fails, a vehicle speed calculated from the non-contact speed sensor (1-6) is compared and not matched with a speed calculated from the shaft speed sensor 2 (1-5) in Step (3-4 B) of FIG. 3, and also compared and not matched with the estimated speed. However, since ranges match each other between the shaft speed sensor 2 (1-5) and the estimated speed, the function and accuracy can be maintained.

Further, description of a section in which the wheels (1-11) and (1-12) are in an adhesive state, and a section from the point (6-1) to the point (6-2) and a section from the point (6-3) to the point (6-4) in FIG. 6 is the same as the above description using FIG. 5.

FIG. 7 is a diagram illustrating a calculation result of a case where both the wheels (1-11) and (1-12) provided with the shaft speed sensors (1-3) and (1-5) slide or idle (non-adhesive state) from when a brake is applied and the vehicle (1-1) starts to decelerate to when the vehicle (1-1) stops.

In FIG. 7, from deceleration start (7-1) to vehicle stop (7-6), the wheel 1 (1-11) slides in a section from a point (7-2) to a point (7-4), and the wheel 2 (1-12) slides in a section from a point (7-3) to a point (7-5). In the above, in a section from the point (7-3) to the point (7-4), both the wheel 1 (1-11) and the wheel 2 (1-12) slide. In this section, as indicated by an alternate long and short dash line and an alternate long and two short dashes line in FIG. 7, a speed obtained from the shaft speed sensor 1 (1-3) and the shaft speed sensor 2 (1-5) shows a value that meanders greatly.

Therefore, in Step (3-3) of FIG. 3, a value from both shaft speed sensors is excluded from vehicle speed calculation. On the other hand, since a speed obtained from the non-contact speed sensor (1-6) is not affected by an adhesive or non-adhesive state of a wheel, the speed calculator (1-7) sets this value as a vehicle speed.

Here, a case where one of three, the shaft speed sensor 1 (1-3), the shaft speed sensor 2 (1-5), and the non-contact speed sensor (1-6), fails will be described.

In a case where the shaft speed sensor 1 (1-3) or the shaft speed sensor 2 (1-5) fails, a shaft speed sensor installed in a wheel in a non-adhesive state is excluded from an input condition of speed calculation in Step (3-3) of FIG. 3, therefore the process of the flowchart of FIG. 3 does not change, and the function and accuracy can be maintained.

In a case where the non-contact speed sensor (1-6) fails, and time during which both the wheel 1 (1-11) and the wheel 2 (1-12) slide is within specified time, the speed determination unit (1-10) sets an estimated speed to a vehicle speed. Further, in a case where the time during which both the wheels slide is outside the specified time, the speed determination unit (1-10) determines that there is a failure and takes measures such as stopping a system.

Further, description of a section in which the wheels (1-11) and (1-12) are in an adhesive state, and a section from the point (7-1) to the point (7-2) and a section from the point (7-5) to the point (7-6) in FIG. 7 is the same as the above description using FIG. 5.

Further, description of a section in which one of the wheel 1 (1-11) and the wheel 2 (1-12) slides and the remaining one of the wheels keeps an adhesive state, a section from the point (7-2) to the point (7-3) and a section from the point (7-4) to the point (7-5) is the same as the above description using FIG. 6.

As described above, the vehicle speed calculation using the vehicle speed calculation device according to the first embodiment is described on the assumption that there are two shaft speed sensors provided on an axle. However, the present invention is not limited to this case, and a plurality of shaft speed sensors more than two may be provided. However, if the number of shaft speed sensors is increased, the risk that a wheel becomes in a non-adhesive state can be further reduced, but cost including vehicle fitting and maintenance is increased and a processing mode for determining a final vehicle speed by a majority decision becomes complicated.

Second Embodiment

The second embodiment according to the present invention is an example of a case where two shaft speed sensors are attached to the same axle and used.

Figure 2:
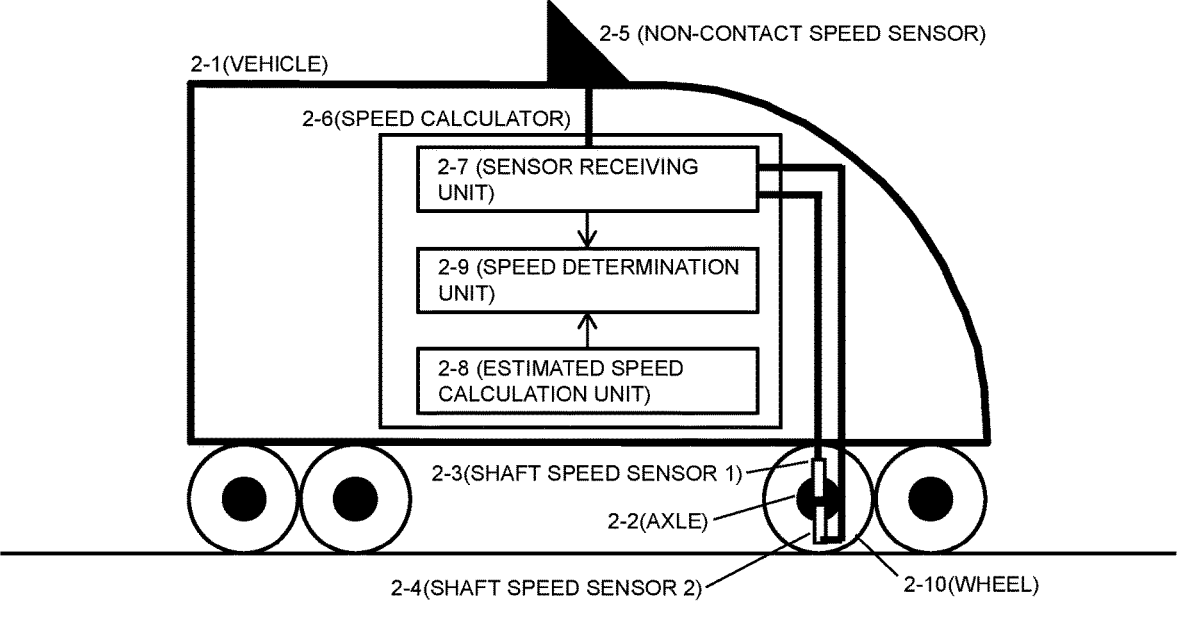
FIG. 2 is a diagram illustrating a basic configuration of the vehicle speed calculation device according to a second embodiment of the present invention.

FIG. 2 is a diagram illustrating a basic configuration of the vehicle speed calculation device according to a second embodiment of the present invention. The present embodiment is different from the first embodiment in that a shaft speed sensor 1 (2-3) and a shaft speed sensor 2 (2-4) are attached to a same axle (2-2).

A mode in which the shaft speed sensor 1 (2-3) and the shaft speed sensor 2 (2-4) are attached to the same axle (2-2) allows packaging of a plurality of sensors on the manufacturing side, and is excellent in cost required for vehicle fitting and maintainability.

On the other hand, in a case where a shaft speed sensor is attached to each of different axles as in the first embodiment illustrated in FIG. 1, the shaft speed sensors are installed at spatially separated positions, so that it is possible to prevent a failure due to a common factor such as a flying stone. Further, as long as two of the wheels (1-11) and (1-12) do not fall into a non-adhesive state, the shaft speed sensor can be used, and detection accuracy can be maintained.

Note that processing content itself according to the second embodiment is the same as that of the first embodiment described above, but since the shaft speed sensor 1 (2-3) and the shaft speed sensor 2 (2-4) are attached to the same axle (2-2), a case of branching from Step (3-3) to Step (3-4B) side in FIG. 3 does not occur.

Although the two embodiments of the present invention are described above, the present invention is not limited to the two embodiments described above, and various modifications can be made without departing from the gist of the present invention.

REFERENCE SIGNS LIST 1-1, 2-1 vehicle
1-2 axle 1
1-3, 2-3 shaft speed sensor 1
1-4 axle 2
1-5, 2-4 shaft speed sensor 2
1-6, 2-5 non-contact speed sensor
1-7, 2-6 speed calculator
1-8, 2-7 sensor receiving unit
1-9, 2-8 estimated speed calculation unit
1-10, 2-9 speed determination unit
1-11 wheel 1
1-12 wheel 2
2-2 axle
2-10 wheel

The invention claimed is:

1. A vehicle speed calculation device comprising:
at least two shaft speed sensors that detect a rotational speed per unit time of an axle of a railway vehicle;
a non-contact speed sensor that detects a speed of the railway vehicle in a non-contact manner with a railway track;
a sensor receiving unit that receives at least two first detection values detected by the at least two shaft speed sensors and a second detection value detected by the non-contact speed sensor;
an estimated speed calculation unit that calculates an estimated speed at present time of the railway vehicle from a latest vehicle speed and acceleration of the railway vehicle; and
a speed determination unit that determines a vehicle speed based on the at least two first detection values, the second detection value, and the estimated speed,
wherein the speed determination unit determines the vehicle speed by selecting a required speed from at least two first speeds calculated from the at least two first detection values, a second speed calculated from the second detection value, and the estimated speed based on an adhesive or non-adhesive state of a wheel including the at least two shaft speed sensors.

2. The vehicle speed calculation device according to claim 1, wherein the speed determination unit compares three speeds selected from the at least two first speeds, the second speed, and the estimated speed by a majority decision based on the adhesive or non-adhesive state of the wheel including the at least two shaft speed sensors, and determines a speed on a majority side as the vehicle speed.

3. The vehicle speed calculation device according to claim 2, wherein in a case where the wheel including the at least two shaft speed sensors is in the non-adhesive state, the speed determination unit excludes the first speed calculated from the first detection value detected by the at least two shaft speed sensors from the comparison by the majority decision.

4. The vehicle speed calculation device according to claim 3, wherein the speed determination unit compares the second speed with the estimated speed in a case where all wheels including the at least two shaft speed sensors are in the non-adhesive state, determines the second speed as the vehicle speed when a speed difference between the second speed and the estimated speed is within a range of tolerance of a speed calculated from the non-contact speed sensor, and determines the estimated speed as the vehicle speed when the speed difference between the second speed and the estimated speed is outside the range of tolerance.

5. The vehicle speed calculation device according to claim 3, wherein the speed determination unit determines that there is a failure in a case where all wheels including the at least two shaft speed sensors are in the non-adhesive state and the non-adhesive state exceeds predetermined time.

6. The vehicle speed calculation device according to claim 1, wherein in a case where three speeds selected from the at least two first speeds, the second speed, and the estimated speed do not match, the speed determination unit determines that the at least two shaft speed sensors or the non-contact speed sensor fails.

7. The vehicle speed calculation device according to claim 1, wherein the estimated speed calculation unit calculates the estimated speed by regarding traveling of the railway vehicle as a constant acceleration motion.

8. The vehicle speed calculation device according to claim 1, wherein two of the shaft speed sensors are attached to a same axle.

9. A vehicle speed calculation method comprising:
a speed calculating step of calculating at least two first speeds from at least two first detection values detected by at least two shaft speed sensors that detect a rotational speed per unit time of an axle of a railway vehicle, calculating a second speed from a second detection value detected by a non-contact speed sensor that detects a speed of the railway vehicle in a non-contact manner with a track, and calculating an estimated speed at present time of the railway vehicle from a latest vehicle speed and acceleration of the railway vehicle; and
a vehicle speed determining step of determining a vehicle speed of the railway vehicle by selecting a required speed from the at least two first speeds, the second speed, and the estimated speed based on an adhesive or non-adhesive state of a wheel including the at least two shaft speed sensors.

10. The vehicle speed calculation method according to claim 9, wherein the vehicle speed determining step compares three speeds selected from the at least two first speeds, the second speed, and the estimated speed by a majority decision based on the adhesive or non-adhesive state of the wheel including the at least two shaft speed sensors, and determines a speed on a majority side as the vehicle speed.

11. The vehicle speed calculation method according to claim 10, wherein in a case where the wheel including the at least two shaft speed sensors is in the non-adhesive state, the vehicle speed determining step excludes the first speed calculated from the first detection value detected from an axle of the wheel from the comparison by the majority decision.

12. The vehicle speed calculation method according to claim 11, wherein the vehicle speed determining step compares the second speed with the estimated speed in a case where all wheels including the at least two shaft speed sensors are in the non-adhesive state, determines the second speed as the vehicle speed when a speed difference between the second speed and the estimated speed is within a range of tolerance of a speed calculated from the non-contact speed sensor, and determines the estimated speed as the vehicle speed when the speed difference between the second speed and the estimated speed is outside the range of tolerance.

\* \* \* \* \*